(No Model.)
2 Sheets—Sheet 1.
M. P. HAGEN.
MEANS FOR HITCHING HORSES.
No. 526,898.
Patented Oct. 2, 1894.
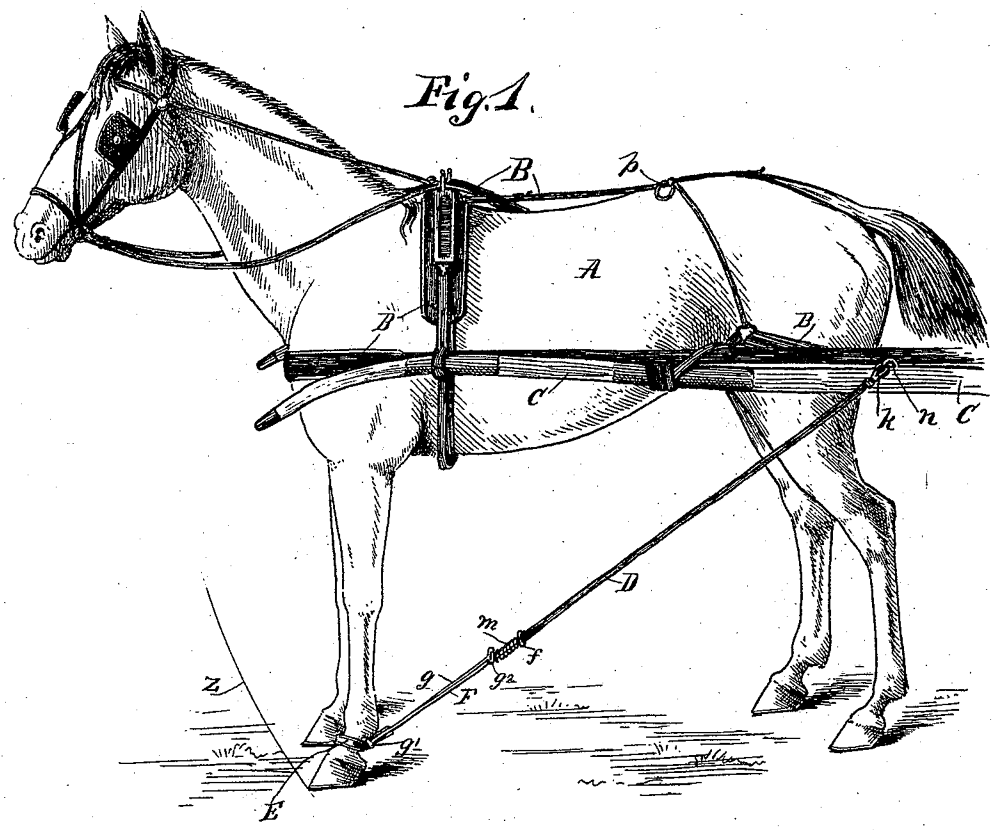
Witnesses
E. F. Elmore,
Frank D. Merchant.
Inventor.
Martin P. Hagen,
By his Attorney.
Jas. F. Williamson
THE NORRIS PETERS CO., PHOTO-LITHO., WASHINGTON, D. C.

(No Model.) 2 Sheets—Sheet 2.
M. P. HAGEN.
MEANS FOR HITCHING HORSES.
No. 526,898. Patented Oct. 2, 1894.
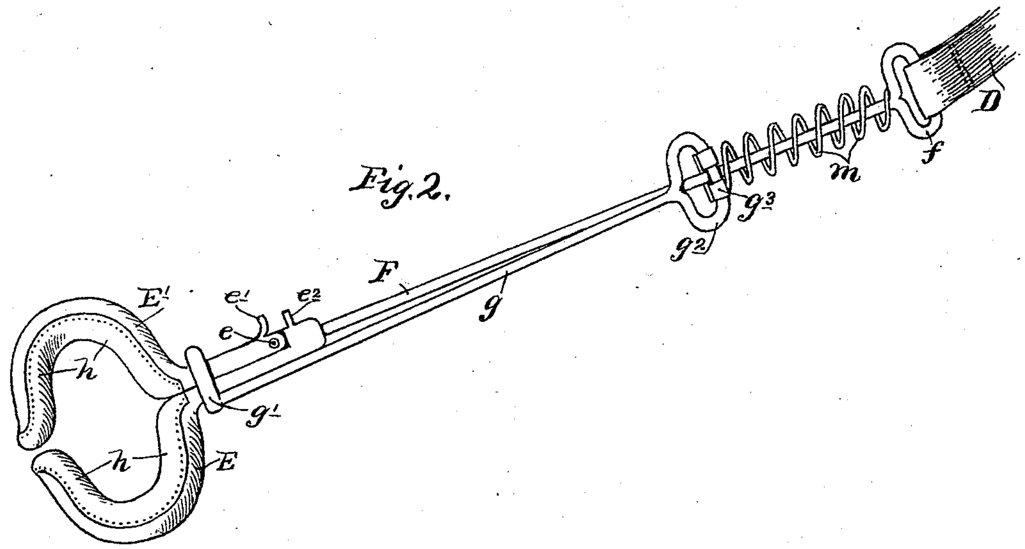
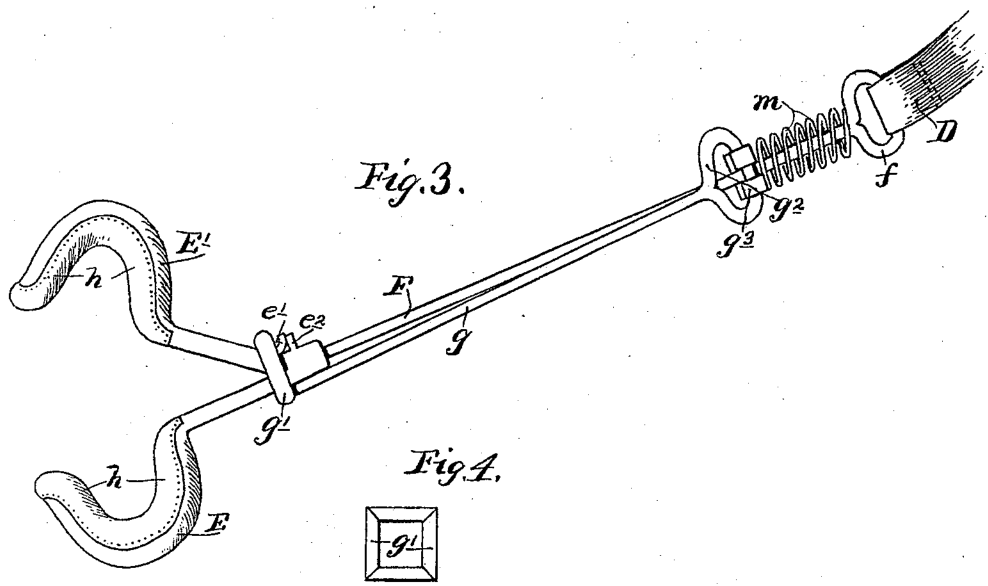
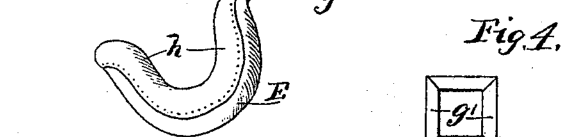
Witnesses.
E. F. Elmore
Frank D. Merchant
Inventor.
Martin P. Hagen,
By his Attorney.
Jas. F. Williamson
THE NORRIS PETERS CO., PHOTO-LITHO., WASHINGTON, D. C.

UNITED STATES PATENT OFFICE.

MARTIN P. HAGEN, OF MINNEAPOLIS, MINNESOTA, ASSIGNOR TO SAMUEL ALEXANDER, OF SAME PLACE.

MEANS FOR HITCHING HORSES.

SPECIFICATION forming part of Letters Patent No. 526,898, dated October 2, 1894.

Application filed May 8, 1894. Serial No. 510,464. (No model.)

*To all whom it may concern:*

Be it known that I, MARTIN P. HAGEN, a citizen of the United States, residing at Minneapolis, in the county of Hennepin and State of Minnesota, have invented certain new and useful Improvements in Means for Hitching Horses; and I do hereby declare the following to be a full, clear, and exact description of the invention, such as will enable others skilled in the art to which it appertains to make and use the same.

My invention relates to means for hitching horses or other draft animals, and comprises a novel hitching device in the form of a strap having a grapple or clasp, which is especially adapted for application to the horse's forward leg, at a point just above the foot and just below the fetlocks; or, in other words, to one of the forward pastern joints.

My invention is illustrated in the accompanying drawings, and the novel features of the same will be further set forth in the following detailed description and be particularly pointed out in the claims.

Referring to the drawings, wherein like letters designate like parts throughout the several views:—Figure 1 is a view in perspective, showing my novel hitching device applied to hitch a horse. Fig. 2 is a plan view of the grapple or clasp, showing the parts in their closed or clasping position. Fig. 3 is also a plan view of the grapple, showing the jaws of the same in their open position; and Fig. 4 is a detail in end elevation, showing one of the parts of the grapple removed.

A represents the draft animal, B the harness, and C the shafts or thills of a vehicle. (Not shown.)

The hitching device, as shown, comprises the flexible strap D, to one end of which is secured the grapple E E′ F $g$, &c.; and to the other end of which is secured a snap-hook $k$.

Referring to the parts of the grapple, E E′ is a pair of grapple-jaws, or hooks, pivoted one upon the other, as shown at $e$.

F is the main or body rod made rigid at one end with the jaw E, and terminating at its other end in the loop eye $f$, to which the strap D is secured.

$g$ is a sliding rod having at one end the sliding clamp rim $g'$, which engages around the stem portions of the jaws E E′, and terminates at its other end, in a loop-eye $g^2$ having secured thereto and working on the rod F, a sliding keeper-guide $g^3$.

$m$ is a coiled spring surrounding the stem F between the loop-eye $f$ and the keeper $g^3$, and tending to keep the rod $g$ and clamp rim $g'$ in their extreme outward position, and the jaws E and E′ closed, as shown in Fig. 2.

It will be noted, that when in their closed positions, any strain on the jaws, such as would tend to open the same, will be resisted by the clamp-rim $g'$ engaging said stem portions, at right angles to the line of movement of said clamp-rim, and hence, said strain will have no tendency to force said rim out of its clamping position. To open the jaws, the loop-eyes $f$ and $g^2$, respectively, on the body-rod F and the slide-rod $g$, are grasped by the hand and drawn together against the spring $m$, in which action, the clamp-rim $g'$ engages with a projecting lip or flange $e'$ on the stem of the pivoted jaw E′, and forces the same open, as shown in Fig. 3. The opening movement of the jaw is limited by a fixed stop $e^2$, projecting from the stem of the fixed jaw E.

All parts of the grapple, so far described, are preferably of spring-steel or other metal, and the inner surface of the jaws E and E′ are preferably provided with a lining $h$, of some soft material, such as felt, to prevent the jaws from chafing the horse's leg, at the point of application.

As already stated, the grapple is preferably applied to one of the forward pastern joints of the horse. The other end of the strap D is secured by means of the spring snap K, to some rearward part of the draft rigging, as for example, to the staple $n$ in the thill C (as shown in Fig. 1), or if preferred, to a ring $p$, secured to the harness B.

As is obvious, when hitched as set forth, and shown in Fig. 1 of the drawings, the horse cannot take a forward step, with the foot to which the grapple is attached; but is, however, at liberty to move his foot in all other directions. For instance, he may raise the foot; but, on attempting to take the forward step, the foot will be drawn back on the line indicated at $z$ in Fig. 1, and caused to fall in its original position.

The term "draft rigging" is used in a sense broad enough to include any and all parts, either of the harness or of the vehicle; or, in case the horse was saddled, the saddle and attachments would be considered the equivalent of the "draft-rigging."

As is evident, various alterations in the details of construction of my hitching device may be made, without departing from the spirit of my invention.

The efficiency of the device has been demonstrated by practical usage.

What I claim, and desire to secure by Letters Patent of the United States, is as follows:

1. A device for hitching a horse or other draft animal, comprising a flexible connection securable at one end to some rearward portion of the draft rigging, and provided at its other end, with a hand operated grapple, consisting of a pair of jaws, having their stem portions pivotally connected together, a sliding clamp or lock-rim working on the stems of said jaws, and means for operating said rim, substantially as described.

2. A device for hitching a horse, or other draft animal, comprising the flexible connection D, securable at one end to the draft rigging and having at its other end the grapple, consisting of the jaws E E′ pivoted at $e$, the body-rod F, secured to the jaw E and terminating at its other end in the loop-eye $f$, the sliding rod $g$ with clamp-rim $g'$ working on the stems of said jaws E E′ and engageable with the projection $e'$ on jaw E′, the keeper $g^3$ at the upper end of the rod $g$, and the spring $m$ or rod F between the loop eye $f$ and the said keeper $m$, substantially as and for the purposes set forth.

3. A device for hitching a horse or other draft animal, comprising the flexible strap D, securable at one end to the draft rigging and having at its other end the grapple, comprising the jaws E E′, pivoted at $e$ and provided respectively, with the lugs $e^2$ and $e'$, the body rod F secured at one end to the jaw E and having at its other end the loop-eye $f$, the sliding rod $g$ with clamp-rim $g'$ working on the stem portion of said jaws E E′ and having at its other end the loop $g^2$ and keeper $g^3$, and the spring $m$ on rod F between the loop-eye $f$, and the keeper $g^2$, all operating substantially as and for the purposes set forth.

In testimony whereof I affix my signature in presence of two witnesses.

MARTIN P. HAGEN.

Witnesses:
SAMUEL ALEXANDER,
JAS. F. WILLIAMSON.